(12) United States Patent
Solis

(10) Patent No.: US 6,444,611 B1
(45) Date of Patent: Sep. 3, 2002

(54) SORBENT COMPOSITION AND APPARATUS FOR REMOVING OIL OR OILY SUBSTANCES FROM WATER, AND PROCESS OF MANUFACTURING SAID COMPOSITION

(76) Inventor: Horatio Solis, 4998 Maisonneuve, #1601, Montreal, Que (CA), H3Z1N2

(*) Notice: Subject to any disclaimer, the term of this patent is extended or adjusted under 35 U.S.C. 154(b) by 58 days.

(21) Appl. No.: 09/650,140

(22) Filed: Aug. 29, 2000

(51) Int. Cl.$^7$ .............. C02F 1/28; C09K 3/00; B01F 3/00; B01J 20/22
(52) U.S. Cl. .......... 502/401; 210/691; 210/924; 252/184; 252/363.5
(58) Field of Search .................. 502/401, 400; 210/693, 924, 690, 691; 252/363.5, 184; 524/917; 526/932

(56) References Cited

U.S. PATENT DOCUMENTS

| 3,617,564 A | 11/1971 | Vander Hooven et al. .... 210/40 |
| 3,902,998 A | 9/1975 | Bertram ................ 210/40 |
| 4,145,256 A | 3/1979 | Bowen ................. 201/25 |
| 4,959,154 A | 9/1990 | Simmons .............. 210/680 |
| 4,969,774 A | 11/1990 | Arseneault et al. ........ 405/60 |
| 5,114,593 A | 5/1992 | Diaz .................. 210/691 |
| 5,160,629 A | 11/1992 | Brown ................ 210/671 |
| 5,236,589 A | 8/1993 | Torrance .............. 210/608 |
| 5,352,780 A | 10/1994 | Webb et al. ............ 536/56 |

Primary Examiner—Wayne A. Langel
Assistant Examiner—Jonas N. Strickland
(74) Attorney, Agent, or Firm—Mila Shvartsman

(57) ABSTRACT

A sorbent composition and process designed for removing oil or oily substances from the surface or upper layer of a body of a water. The sorbent composition consists of raw peanuts hulls crushed to a plurality of particles of predetermined dimensions. The composition further comprises crushed raw peanut kernels provided to create a hydrophobic/oleophilic protective film around those particles. Protective film is formed by treatment of the mixture in a rotary kiln at a predetermined temperature and a restricted air flow. An apparatus for removing oil or oily substances from a surface or upper layer of a body of a water comprises a flexible ballast feeding pipe containing the sorbent composition. The pipe is immersed on predetermined depth below an oil spill water surface area and contains a number of injection nozzles distributed along the pipe. The injection nozzles are provided to eject the sorbent composition from the pipe into an underwater medium to facilitate a uniform sorbent mixture distribution over the area polluted by the oil spill. Sorbent composition is capable to ascent immediately to the surface of the water to form a second layer that floats below an oil spill layer and insures an unavoidable mutual physical contact with this oil spill layer.

8 Claims, 4 Drawing Sheets

SORBENT COMPOSITION AND APPARATUS FOR REMOVING OIL OR OILY SUBSTANCES FROM WATER, AND PROCESS OF MANUFACTURING SAID COMPOSITION

BACKGROUND OF THE INVENTION

1. Field of the Invention

This invention details a process for control and clean up of minor and massive oil spills from the surface of water using pre-treated peanut hulls as sorbent. Method for producing such sorbent and its appropriated application technique in open waters are also detailed.

2. Introduction

It is well known that oil spills in open waters produce serious ecological, environmental and economical damage. According to the National Research Council estimates, the sources and amounts of oil-related pollutants dumped into the oceans each year are:

Down the Drain: 363 million gallons, including used engine oil that constitutes run-off from land, and municipal and industrial waste.

Routine Maintenance: 137 million gallons including bilge cleaning and other ship releases.

Up in smoke: 92 million gallons including air pollution, mainly from cars and industry.

Natural Seeps: 62 million gallons including seepage from ocean bottom and eroding sedimentary rocks.

Big Spills: 37 million gallons including tanker accidents.

Large spills, even though a relatively minor source of ocean oil pollution, can be devastating. Only about five percent of oil pollution in oceans are due to major tanker accidents, but one big spill can disrupt sea and shore life for miles. The impact of oil on shorelines may be particularly great where large areas of rocks, sand and mud are uncovered at low tide. The National Oceanic and Atmospheric Administration estimates that the Exxon Valdez accident of 1989 in Alaska spilled around 11 million gallons of crude oil, killing 350,000 to 390,000 water fowl, 3,500 to 5,500 sea otters, and cost more than five billion US dollars. The impact on marine life was compounded by toxicity and tainting effect resulting from the chemical composition of the oil, as well as by the diversity and variability of biological systems and their sensitively to oil pollution. According to the same source of information, three years later the relative percent distribution of the oil mass released into the environment was:

50% Biodegraded/Photolysed

20% Atmospheric photolysis

14% Recovered

13% Subtidal sediment

2% Beached

1% Dispersed in water

From the above results it is clear that even after catastrophic spills like the Valdez, with enough time natural forces act to counteract the pollution. However, the worst immediate consequences of a massive oil spill are due to the shock produced by the overwhelming mass of hazardous substances suddenly released into an environment which was not prepared to digest it and unable to restore itself to its original condition by itself in a short time.

Thus, we can deduct that one of the fundamental aims of oil spill response strategies should be to react as soon as possible with appropriate countermeasures in order to restrict or minimize the spread of the damage. With that purpose in mind, it is the aim of the present invention to propose an alternative response methodology conceived for the treatment and remedy of extended polluted water surfaces with celerity, bearing in mind that the areal distribution of the injury is time dependent.

It is important to emphasize here that a sorbent composition of the present invention is apt and can be used with the same comparative advantages in many different situations, such as for treatment and remedy of routine maintenance spills, land spills and others, and may be applied directly on the polluted surface by any classical methodology. The preferred embodiment mainly focuses on an oil spill in open waters because, as it is well known to the skilled in the art, it is probably the worst condition to control, handle and remedy. The clean-up components are exposed to the punishing mercy of the elements, and are under dynamic conditions.

PRIOR ART

Many compounds, apparatus and techniques were proposed by the prior art to facilitate the mitigation of deleterious effect or the removal of oil pollutants from water. In a general sense, the scope of available tools and methodologies to combat such pollution can be summarized as follows:

Chemical Agents: elements, compounds or mixtures that coagulate, disperse, dissolve, emulsify, foam, neutralize, precipitate, reduce, solubilize, oxidize, concentrate, congeal, entrap, fix, make the pollutant mass more rigid or viscous. The above compounds include biological additives, dispersants, sinking agents, burning agents, but do not include solvents. Chemical Agents have been applied to disperse and biodegrade oil spills; however, such applications, far from be beneficial, could result in worse environmental damage.

Apparatus: skimmers, booms, pumps, hydrocyclones, barriers, mechanical separators, containers, filters, bags, separators, recovery vessels, etc. Apparatus are of limited effectiveness for the control and recovery of extended oil spills, and are very difficult or are unfeasible to be used under adverse meteorological conditions.

Sorbents: essentially inert and insoluble materials that are used to remove oil and hazardous substances from water through adsorption and/or absorption. They include:

a) organic products (peat, moss or straw, cellulose fibers or cork, corn cobs, chicken or duck feathers, wood chips, cereals;

b) mineral compounds, volcanic ash or perlite, vermiculite or zeolite;

c) synthetic products (polypropylene, polyethylene, polyurethane, polyester).

Mineral sorbents are of relatively high density, and after their spread on top of the water surface they sink to the bottom forming a stationary layer saturated with oil that affects the benthos. Synthetic sorbents are not biodegradable per se and need to be recovered and processed by treatment facilities for disposal Organic sorbents, including the herein proposed option, are biodegradable, non toxic, effective and usually cheap.

There are known the following patents related to the application based on methods of utilization of natural organic sorbents:

U.S. Pat. No. 3,617,564 disclosing the utilization of corncob components for the removal of oil spills from water and land.

U.S. Pat. No. 3,902,998 disclosing a method for removing oil from water based on the utilization of rice hulls as sorbent.

U.S. Pat. No. 4,959,154 disclosing the utilization of pre-treated wood chips for the cleanup of water and land oil spills.

U.S. Pat. No. 4,969,774 disclosing the use of pre-cooked and puffed cereals as oil spill sorbents.

U.S. Pat. No. 5,114,593 disclosing the application of dry and pulverized aquatic lily plant to the spilled oil.

U.S. Pat. No. 5,160,629 disclosing a method for removing organic substances from bodies of water using entire dried corn cobs in their natural state.

U.S. Pat. No. 5,352,780 discloses a method for absorbing, removing and cleaning up a liquid floating in a second liquid, employing absorbent pellets made from cellulose flakes.

Peanut shells were previously used as particulate cellulosic raw material for the production of a carbonaceous residue product or char. U.S. Pat. No. 4,145,256 discloses the procedure and apparatus for the carry out of such an operation. Even though at first glance some similitude exists to the above patent with the proposed sorbent pre-treatment methodology herein, the basic fabrication principles and resulting final products are clearly different. These differences will be evident after a detailed examination and comparison between both technical procedures, and can be summarized as follows:

in the abovementioned U.S. Pat. No. 4,145,256, peanut shells are submitted to a destructive discomposure. Reaction temperatures vary between 526° C. (975° F.) to 1315° C. (2410° F.); the result is that the final product is a devolatilized powdered or carbonaceous residue or char, having an elemental carbon content in excess of about ninety percent by weight.

in the same US patent such high temperatures are reached by the use of a controlled amount of forced air introduced into the system that produces the exothermic oxidation of the heavy tars distilled from shells.

in the same process, the heavier distilled tars condense on the shells in the upper strata of the reaction chamber; they migrate to the maximum temperature region of that chamber whereby they progressively further discompose and carbonize to build up the final carbonaceous residue product.

SUMMARY OF THE INVENTION

It is the aim of the present invention to provide a sorbent composition and apparatus to combat oil spills and other hazardous pollutants floating on or in water, based on the utilization of pre-treated peanut hulls as sorbent and complemented by a specific application technique of such sorbent for the cleanup of such oil spills in open waters.

The selection criteria for the utilization of peanut hulls as sorbent was found in the following characteristics and advantages:

peanut hulls, as a natural vegetal product, are non toxic, biodegradable and innocuous in any amount applied;

as waste or byproduct of the peanut industry, the sorbent is cheap, abundant, and their pre-treatment is simple and economical;

to be complementary to the proposed application technique in open waters, the sorbent needs to be the least dense possible; adequately pre-treated, it needs to maintain its oleophilic characteristics even after it has been immersed in water for a considerable time before contact with the oiled surface;

under the herein proposed dosage ratio, the sorbent acts immediately and retains the sorbed oil with enough tenacity to minimize the tainting effect by the occasional physical contact of the oiled mass with any solid dry or wet surface (animal, rocks, beach, etc); it also works satisfactorily with crude oils of different viscosity and density;

after the application and impregnation, the oiled sorbent forms a buoyant rimed-like layer that permits its control and collection by mechanical devices (booms, skimmers, pumps, nets, etc.) during a reasonable time, and can be subsequently introduced into a recovery process if desired;

some hours after its application, the oiled sorbent acts as particulate physical dispersant, with the advantage that the oiled mass does not need be necessarily recovered to mitigate the damage;

after the oil/water saturation, the sorbent tends to reach an equilibrium condition with a final apparent maximum density of about 1.27 $g/cm^3$, and behaves in that medium like any other light vegetal detritus, preventing the subsurface penetration of oil into cobble and boulder beaches. The washed-up material on shore is dry to the touch after its natural water evaporation and drying, does not stain, and can be easily recovered by vacuum techniques;

with the abovementioned physical sorbent characteristics, the application technique in open waters can be conceived to sweep extended polluted water surfaces efficiently, in a short time, can be used under adverse meteorological conditions, and is apt for the cleanup of partially ice-covered water surfaces.

According to the National Agricultural Statistics Service, USDA, the production of peanuts in the US during 1998 was about 1,800,000 tons. Roughly three-quarters of the peanuts grown are used domestically as edible products. About one-fourth of the production is exported to other countries. From the approximately 1,300,000 tons consumed yearly in the US, 10% is sold as in-shell peanuts (Valencia variety). The remaining 90% (Runner variety), about 1,170,000 tons, are commercialized shelled.

Considering that in one pod (Runner variety), the shell represents roughly 18% of the total weight, the result is that about 200,000 tons of waste or by-product shells are theoretically available each year for diverse uses. At the present time, shells are mostly actually used in wallboard, fire place logs, fiber roughage for livestock and kitty litter.

BRIEF DESCRIPTION OF THE DRAWINGS

FIG. 2b is a cross-sectional view of FIG. 2a.

DETAILED DESCRIPTION OF THE INVENTION

The present invention comprises two complementary sections. First and foremost is the sorbent composition and process of preparation, and secondly, the proposed apparatus of using such sorbent composition in the open waters.

Sorbent Composition and Process of Preparation

Peanut hulls are a natural biodegradable woody sorbent material, extremely porous and of low density, and endowed with intrinsic hydrophobic characteristics. Apparent density of in-bulk dry shells is about 160 kg/m$^3$. Even after they have been immersed in sea water for hours, the hulls retain their high buoyancy owing to the spongy tissue structure. If the immersed mass is liberated under an aqueous medium covered by oil, it ascends immediately to the surface forming a buoyant layer that floats even over the crude oil. For use as a sorbent composition, raw peanut hulls should be crushed to a plurality of particles of predetermined dimensions, and pre-treated by basic pre-treatment, which comprises toasting in a rotary kiln at 310° C. to provide oil affinity. Such pre-treated sorbent composition allows to achieve up to 80% efficiency when applied to the oil spills.

However, if the raw peanut hulls which were pre-treated by the basic pre-treatment (toasting) stay in the water too long previously to the contact with the oil, they still have insufficient oil affinity; thus, it is necessary to add an advanced pre-treatment in order to enhance and maintain their oleophilic characteristics. Therefore, one aim of the present invention is to provide a pre-treatment methodology in order to transform the raw peanut hulls into an efficient oil adsorbent/absorbent that would work under any application conditions.

Figure 1:
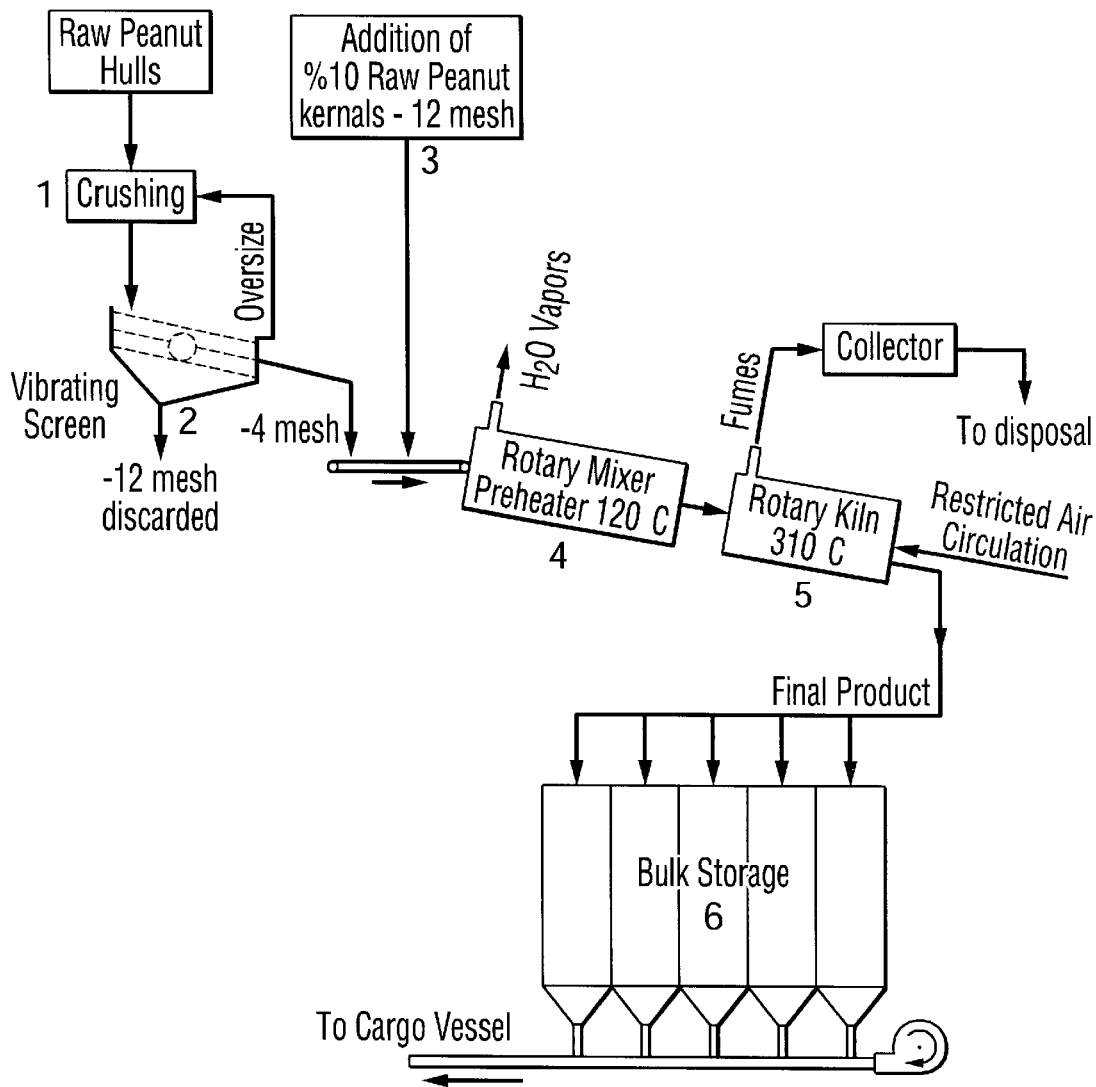
FIG. 1 illustrates a schematic way for the proposed process to produce the sorbent according to the present invention.

FIG. 1 illustrates the basic steps for the sorbent preparation process. Raw peanut hulls are obtained from the peanut industry as waste or by-product, crushed at the shelling plants (step 1) and sieved (step 2) to −4 mesh, +12 mesh (USA Series); that is, −4.75 mm, +1.70 mm. From experiments, 1,000 g of raw shells (Runner variety) yield approximately 780 g of sieved material. Particles under 12 mesh (about 220 g) are rejected. The sieved hull particles obtained above are mixed with 10% (by weight) raw peanut kernels (−12 mesh) (step 3), and pass through a rotary mixer/preheater (step 4) where they are carefully mixed and dried at 120° C. The dried mass is then passed through a rotary kiln (5) and toasted at a temperature of about 310° C. (590° F.) under restricted air flow circulation. Under these conditions, the oily fumes generated by the heating of the added kernel particles adhere to the surfaces of the hull particles forming a hydrophobic/oleophilic protective film. It is important to emphasize here that the advanced pre-treatment toasting process needs to be conducted under a controlled air flow system in order to profit as much as possible from the generated oily fumes.

Comparing the technical procedure of char production as proposed by U.S. Pat. No. 4,145,256, the temperature reaction in the present invention should be substantially below the temperature of char production, wherein the oily fumes produced by the heating are decomposed and carbonized completely, and the desired oily atmosphere in the kiln is destroyed. In contrast, in the present invention it is precisely the upkeep of the oily atmosphere, which produces the adequate internal conditions for the formation of a protective hydrophobic/oleophilic film on the surface of the hull fragments, is the important factor that creates the desired final product.

The residence time in the kiln can be estimated by means of the weight reduction of the original mass after the treatment. In a test laboratory 1,000 g of dried (110° C.) crude material yields about 700 g–720 g of final product after treatment, being a weight reduction of about 28%–30%. The final product is a scaly particle aggregate demonstrating an incipient carbonization, a superficial oily staining and metallized-like aspect, with an in-bulk apparent density of 140 kg/m$^3$. The sorbent is now ready to be utilized and can be stored in the usual way used for bulk storage (6) used for cereals or the like.

Sorbent Application Apparatus

The cleanup of oil spilled in open waters is one of the most troublesome tasks to afford, considering the natural tendency of the pollutant to spread as a thin layer, and the fact that the success of the countermeasures is always subordinated to the circumstantial meteorological conditions. In order to achieve such task successfully and to be operatively independent of the mentioned climatic factors as much as possible, we propose a specific remediation apparatus for that scene, developed in accordance with the physical characteristics of the sorbent detailed above.

Regardless the type of sorbent used, one of the main factors to take into account for an efficient oil absorption concerns the effectiveness of the physical contact of oil-to-sorbent. Obviously, the more favoured the mutual physical interaction, the better the absorption. The proposed apparatus of the present invention is designed to make an optimum oil-to-sorbent contact, and is primarily based on the high buoyancy of the peanut hulls.

However, the apparatus of the present invention is not restricted to the use of peanut hulls as the sorbent composition, and any other sorbents having similar characteristics could be used instead of peanut hulls.

To illustrate the result of using the apparatus of the present invention, similar conditions were simulated by using a water tank, into which a pre-determined amount of sorbent (pre-treated peanut hulls) was placed and retained below the surface of the water by means of a perforated container (net, bag, etc.) in such a way that the whole mass was in direct contact with, and saturated in the water. A determined amount of crude oil was spilled over the water surface thus forming a polluted layer.

When the immersed sorbent mass was liberated underwater, it ascended immediately to the surface due to its high buoyancy; because of the natural tendency of the particle mass to reach an equilibrium in the free medium, the sorbent spread abroad forming a second layer similar to, and in contact with, the crude oil layer. If the sorbent density is enough low, the new solid layer (sorbent) floats even over the previous crude oil layer, insuring an unavoidable mutual physical contact.

The exposed idea is the basis of the herein proposed sorbent application apparatus using "Reverse Application" principle. Of course, the efficiency of oil adsorption/absorption depends, at last, on the oil affinity and other physical characteristics of the sorbent, which in the present case was expressly prepared to work under such conditions. According to laboratory experiments, a suggested dosage ratio of sorbent-to-crude oil is 1.5:1 by weight; this was sufficient to assure a complete oil adsorption/absorption.

Figure 2A:
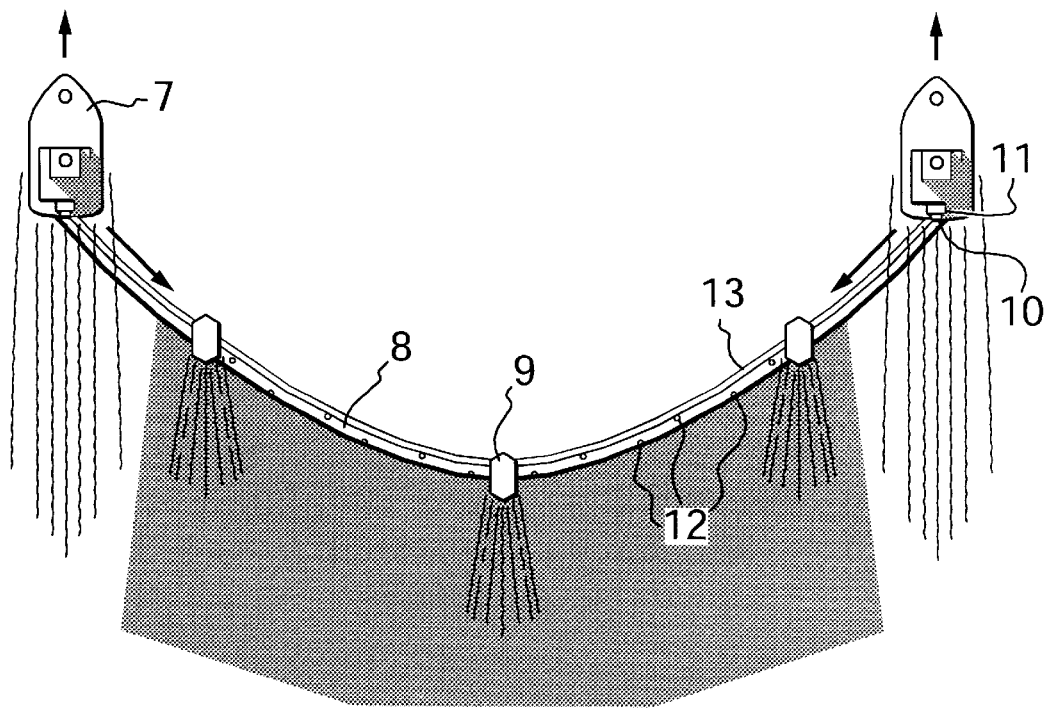
FIG. 2a illustrates schematically the top view of the apparatus of the present invention for the cleanup of oil spills in open waters.

FIGS. 2a and b illustrate how to put in practice the sorbent application apparatus in a real case for an oil spill remediation in open waters. Two cargo vessels 7 loaded with in-bulk sorbent and working jointly are connected by a holding means or flexible ballasted feeding pipe 8 of appropriated diameter which is maintained at predetermined depth below the water surface (i.e. 4–12 feet) supported by the floats 9. Each end 10 of the pipe 8 fit up on each vessel 7 to a respective sorbent injection device 11. Injection nozzles 12 are distributed along the feeding pipe 8 at regular intervals. The pipe 8 is firmly attached parallel at full length to a grip traction cable 13. The sorbent is sucked up from the respective cargo vessels 7 and injected under pressure with air, water or a mixture of both, by means of an air-compressor or water pump (not shown) from injection device 11. The sorbent is transported at the fill length of the pipe 8 and ejected through the nozzles 12 into the underwater medium. As the sorbent is ejected, the polluted area is slowly raked by the vessels 7 in such a way as to achieve a sorbent distribution as uniform as possible. The amount of sorbent applied by square meter can be regulated by varying the injection pressure or the speed of the vessels according to the mass of pollutant to be treated.

Figure 2B:
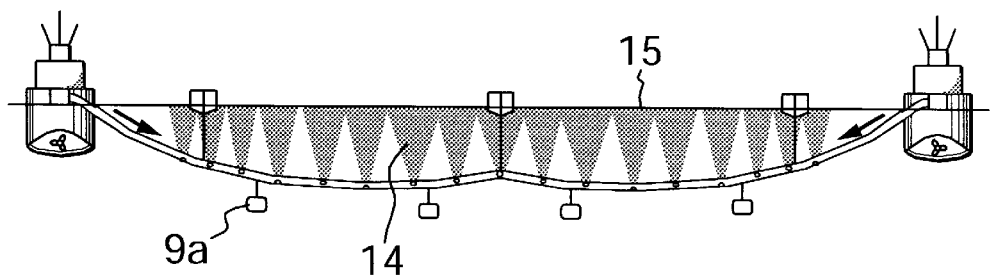

After the underwater injection 14 (see FIG. 2b), the sorbent ascends immediately to the surface 15, spreads abroad and in contact with the oiled surface. If the dosage ratio of sorbent-to-oil as suggested herein is maintained (1.5:1 by weight), the final product is attained after few minutes of natural stirring and homogenization; the product will be a rimed-like, scaly, buoyant semi-solid layer impregnated with oil. As the product is forming, the water surface is cleaned up from the pollutant. The tainting effect of the crude oil is almost completely neutralized by the strong preferential adsorption over the sorbent's surface.

One of the most important benefits of the underwater sorbent application apparatus of the present invention is that the clean-up process can be carried out satisfactorily under relatively adverse meteorological conditions (e.g.: rough seas) because the sorbent can be applied below the wave train. Even more, and for the same reason, the application technique could be used to clean up partially ice-covered water surfaces. For this purpose, the floats 9 can be removed, and their function replaced by appropriated weight balances 9a and/or hydrodynamic profile of the feeding pipe 8 (not shown).

Figure 2C:
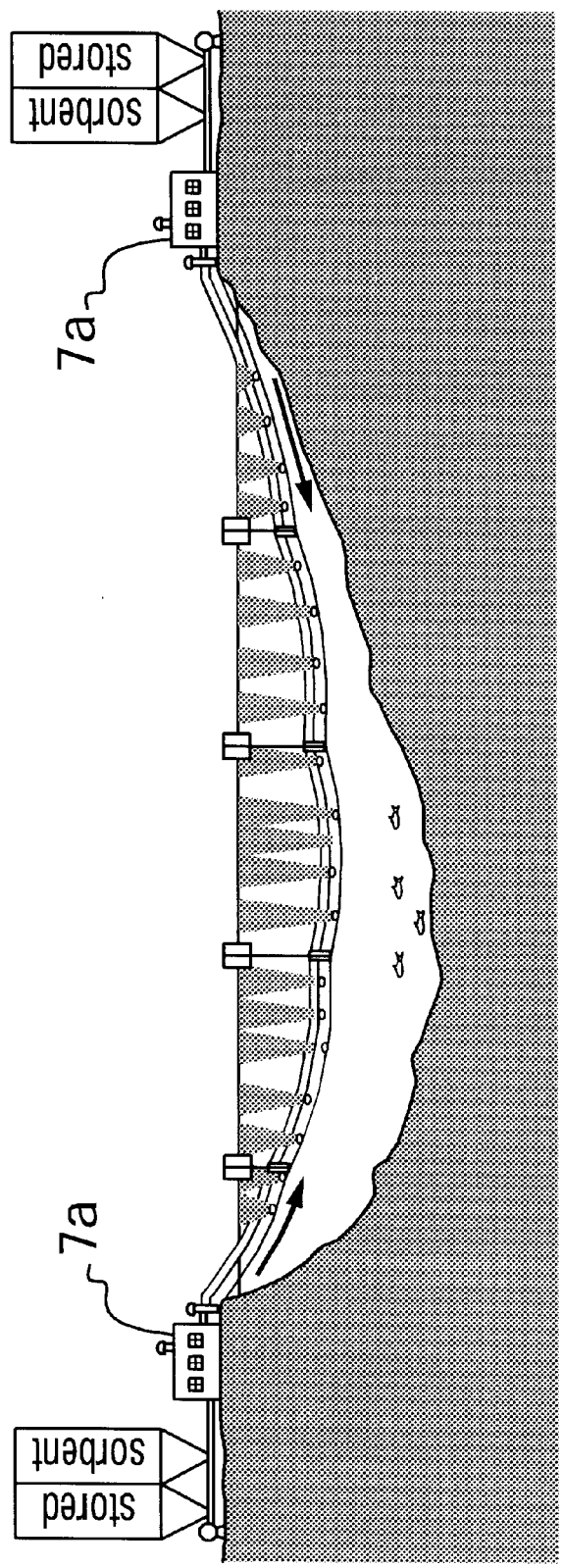
FIG. 2c illustrates schematically the cross-sectional view of the apparatus of the present invention for the cleanup of oil spills in the river.

If the clean-up situation occurs in confined waters where the polluted water volume has a defined drainage direction (river, stream), the mobile vessel feeding plants 7 can be replaced by a couple of land-based stationary or temporary feeding plants 7a (see FIG. 2c) situated transversally to the drainage direction, and mutually connected by the ballasted feeding pipe 8 in a similar manner as shown on FIGS. 2(a and b). The suggested diameter of feeding pipe 8 is between 3 and 10 inches depending on the particular case, and suggested flexible material is synthetic plastic or rubber.

Sorbent Dispersive Properties

Figure 3:
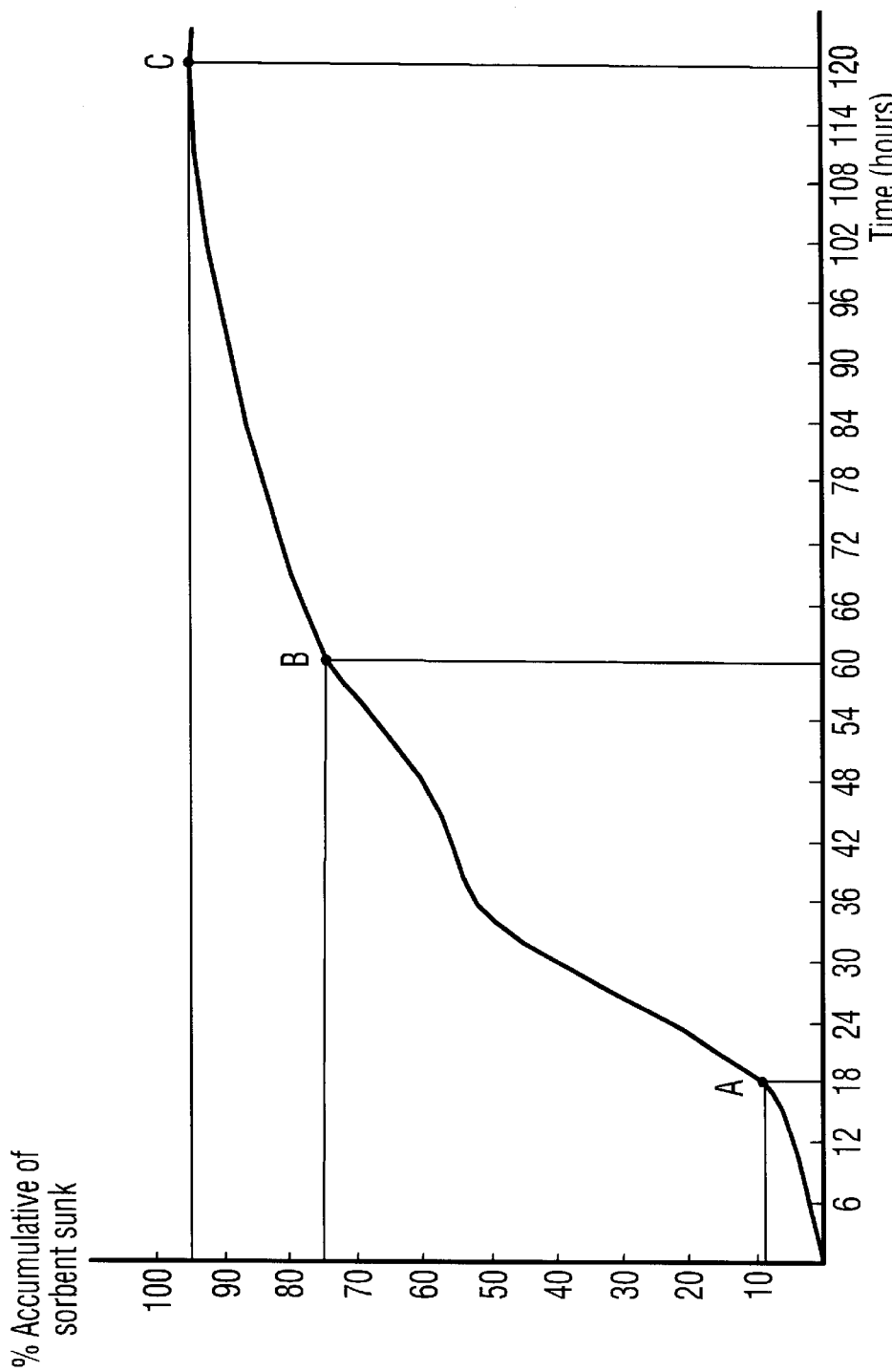
FIG. 3 illustrates the experimental curve graphically showing the behaviour of the sorbent as physical dispersant and the expected evolution of the oil/sorbent mass in that medium with the time.

FIG. 3 illustrates graphically the result of a laboratory test (see Test 3) to predict the possible time evolution of an oil and sorbent mass in sea water after the sorbent application. During the first 18 hours (point A), the rate of sinking gradually reached 8% of the whole mass. That is, more than 90% of the total mass is accessible to be collected by mechanical devices (pumps, skimmers, booms, nets, etc.). From that point (point A), the slope of the curve increases and reaches a level after 60 hours where about 75% of the material is sunk (point B). Between 60 hours and 120 hours, the curve becomes more asymptotic, reaching a level where approximately 95% of the initial mass is sunk (point C). If we assume that the remediation process occurs in open waters under dynamic conditions where some free movement of the water mass exists (currents, tides), during a time interval of about 120 hours (interval A-B-C) the sunk mass will be disseminated inside a large water volume. In other words, the curve interval A-B-C could be considered roughly as the time interval in which the impregnated sorbent acts as physical dispersant. According to our laboratory tests, the maximum relative density of the sunk mass is about 1.27 g/cm$^3$.

It must be emphasized that if the mass which is uncollected in the first 18 hours sinks due to the particular property of the sorbent composition of the present invention, it will not reach the bottom of the ocean, but will be eventually delivered by underwater streams to the shore, where it will dry out without damaging the source of beaches and will remain neutral to its surroundings until it is collected.

Finally, due to a specific density of the oil-sorbent mixture of the present invention, it will disperse in a large area of open water, thus fulfilling the exact purpose of a chemical dispersant without any toxic-impact on the environment.

Test 1

Fifty grams of sorbent were introduced into a 1000 ml hermetic flask and vigorously shaken for 5 minutes with 600 ml of sea water. The solid mass was then filtered out by a kitchen colander and transfer to an open skimmer-like, bell shaped, ballasted container. This container was introduced face-down into a 5-liter tank in such a way that the opening was in contact with the bottom of the tank. The container was maintained firmly pressed against the bottom of the tank by means of a stirring rod, and about 4 to 4.5 liters of sea water (at 20° C.) were added to the tank. The remaining entrapped air bubbles retained by the sorbent were expelled by careful movement of the plastic container with the stirring rod, assuring that the whole sorbent mass was in contact with the water. This condition of water saturation was maintained for at least 15 minutes, after which 34 g (~37 ml) of crude oil density 0.91 g/cm$^3$ was added with a syringe to the water surface. The final dosage ratio of sorbent-to-oil was 1.5:1 by weight. The plastic container, until now held against the bottom, was turned face up with the aid of two stirring rods. The liberated mass of sorbent ascended immediately to the water surface and contacted the oil layer as postulated in the proposed application technique.

After a few seconds of stirring with the rod, the oil adsorption and retention by the sorbent was complete. The water surface showed no signs of free oil. The resulting rimed-like scaly mass of impregnated sorbent retained the oil firmly even after it was vigorously shaken. All solid elements introduced through the water surface (finger, rod, stone, etc.) were extracted without any oily taints.

Test 2

The above detailed process was repeated exactly, with the only difference being that in this test the water medium was maintained at 4° C. by means of crushed ice. In other words, this test attempted to reproduce the conditions of application on an ice-covered water medium. Even though the crude oil became thicker by the effect of the low temperature, the adsorption efficiency was maintained, but with a slight delay of the homogenization if compared to the above test. The final result was similar, as well as the clean up of the water surface and the elimination of the tainting effect of the oil.

Test 3

Same conditions as Test 1, variation being that there are 20 liters of sea water at 20° C. After application in the described way, the sunk sorbent particles were collected with an adequate device at regular intervals of 6 hours during a period over 120 hours, with occasional stirring of the whole mass. The collected fractions were transferred to individual aluminium containers, dried at 95° C. and weighed. The sorbent sinking curve illustrated in FIG. 3 was prepared with the registered time-table and the dry weight of each fraction. It must be stated that the weight reduction for crude oil (with density of 0.91 g/cm$^3$) heated for a short time at 95° C. can be considered negligible for the purposes of present test.

Test 4

Sorbent Toxicity

Two small Goldfish (Carassius auratus) were introduced in respective fish globes, each with about 2.5 liters of fresh water and environmental conditions similar to any aquarium A small net bag with three grams of sorbent was prepared, transferred to one of the fish globes (test globe), and maintained totally immersed in the water by means of ballast. The other fish globe (constant globe) had no foreign matter such as sorbent introduced. After five days the test globe fish appeared to be in perfect health, and an additional three grams of sorbent was added to the water surface to completely cover it with a sorbent layer. This condition was maintained for another ten days. After fifteen days, the test globe fish had a healthy appearance, with same vital signs and reflex actions as the constant globe fish. After this experiment, both fish were healthy and liberated to an appropriate natural environment.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

What is claimed is:

1. A sorbent composition for removing oil or oily substances from the surface or upper layer of a body of a water comprising:

raw peanuts hulls crushed to a plurality of particles of predetermined dimensions and pre-treated by toasting, wherein said crushed and pre-treated particles are characterized by high buoyancy, oil affinity and intrinsic hydrophobic characteristic allowing to maintain said oil affinity after immersion in the water for a considerable time, and wherein said composition acts as an effective physical dispersant, wherein said particles further comprise a predetermined amount of raw peanut kernels provided to enhance and maintain the oil affinity of said particles, said added raw peanut kernels are provided to create a hydrophobic/oleophilic protective film around said particles, wherein said protective film is formed by treatment of said compositions in a rotary kiln at predetermined temperature and a restricted air flow, and wherein said particles are capable of retaining oil of different viscosity and density.

2. A sorbent composition according to claim 1, wherein said particles have dimensions between −4.75 mm and +1.70 mm.

3. A sorbent composition according to claim 2, wherein said composition comprises around 10% by weight of said raw peanut kernels and wherein said kernels have a dimension of −12 mesh.

4. A sorbent composition according to claim 1, wherein said sorbent composition after being subjected to oil/water saturation reaches an equilibrium condition with a final maximum density of about 1.27 g/cm$^3$, and wherein said oil-saturated sorbent composition prevents a subsurface penetration of the oil into any solid dry or wet surfaces by retaining the oil on washed out particles without damaging or staining said solid dry or wet surfaces.

5. A process for preparation of a sorbent composition provided for removing oil or oily substances from the surface or upper layer of a body of a water comprising:

crushing and sieving raw peanut hulls by crushing and sieving means into particles of a predetermined dimensions to create an oil adsorbent/absorbent composition having a high buoyancy;

mixing said particles with raw peanut kernels, wherein said mixture is being further pre-heated by a rotary mixer/preheater means;

toasting said mixture of particles and raw peanut kernels under restricted air flow circulation to generate a hydrophobic/oleophilic protective film around said particles, wherein said toasting is facilitated by passing of said mixture through a rotary kiln.

6. A process according to claim 5, wherein said raw peanut kernels are added to said composition in the proportion of 10% by weight of the total composition, and wherein said mixture is pre-heated at the temperature around 120° C.

7. A process according to claim 5, wherein said particles are sieved by sieve means having dimensions between −4 mesh and +12 mesh.

8. A process according to claim 5, wherein said mixture being toasted in said rotary kiln, are treated at a temperature around 310° C.

* * * * *

UNITED STATES PATENT AND TRADEMARK OFFICE
CERTIFICATE OF CORRECTION

PATENT NO.   : 6,444,611 B1
DATED        : September 3, 2002
INVENTOR(S)  : Horacio Solis It is certified that error appears in the above-identified patent and that said Letters Patent is hereby corrected as shown below:

<u>Title page,</u>
Item [76], Inventor(s) name should read:
-- [76] Inventor(s):  Horacio Solis --

Signed and Sealed this

Eighteenth Day of March, 2003

JAMES E. ROGAN
*Director of the United States Patent and Trademark Office*